United States Patent Office 2,786,067
Patented Mar. 19, 1957

2,786,067

TRIEPOXIDES AND PROCESS FOR MAKING THE SAME

Frederick C. Frostick, Jr., South Charleston, and Benjamin Phillips, Charleston, W. Va., assignors to Union Carbide and Carbon Corporation, a corporation of New York No Drawing. Application October 7, 1954,
Serial No. 461,022

4 Claims. (Cl. 260—348)

This invention relates to a new series of organic chemical compounds and has for an object the provision of new types of epoxide compounds which are useful in the plastics and resins industry. More particularly, this invention is directed to compounds comprising 3,4-epoxycyclohexylmethyl-9,10,12,13-diepoxystearates and to a process for the preparation of these compounds.

The 3,4-epoxycyclohexylmethyl-9,10,12,13-diepoxystearates of this invention may be graphically represented by the following general formula:

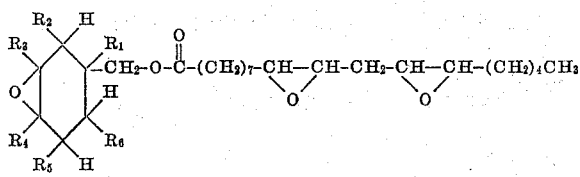

wherein $R_1$ through $R_6$ represent hydrogen or lower alkyl groups. More particularly, the groups $R_1$ through $R_6$ represent groups such as hydrogen, methyl, ethyl, propyl, isopropyl, butyl, isobutyl and tertiary butyl groups with the further provision that the total number of carbon atoms in all of the alkyl groups preferably does not exceed 10.

A particularly preferred group of 3,4-epoxycyclohexylmethyl-9,10,12,13-diepoxystearate include 3,4-epoxycyclohexylmethyl-9,10,12,13-diepoxystearate, 3,4-epoxy-1-methylcyclohexylmethyl-9,10,12,13-diepoxystearate and 3,4-epoxy-6-methylcyclohexylmethyl-9,10,12,13-diepoxystearate and the like.

One of the most interesting characteristics of the compounds of this invention is the difference in reactivity of the epoxide rings of the triepoxides. For example, the epoxide group attached to the cycloaliphatic portion of the molecule is more easily attacked by acidic reagents and active hydrogen compounds such as phenols, alcohols, carboxylic acids and the like than are the epoxide groups attached to the aliphatic portion of the molecule. Thus selective reaction of the epoxide group of the cycloaliphatic portion of the molecule can be induced while the other epoxide groups of the aliphatic portion remain unattacked. By virtue of this selective reactivity of the various epoxy groups present in the compounds of this invention, it is possible to convert these monomers to soluble, fusible resins which can later be thermoset to form insoluble, infusible products. This characteristic makes the compounds useful in formulations of resin mixtures for castings, surface coatings, and laminates. Another characteristic possessed by the compounds of this invention is ability to plasticize and/or stabilize various synthetic organic resins, particularly halogen-containing resins such as polyvinyl chloride. Because of their relatively high molecular weights and low volatility these compounds impart good permanence to resin compositions. The epoxide rings are substantially compatible with vinyl chloride resins and also stabilize the resins, probably by virtue of their ability to act as scavengers for hydrogen chloride and other acids capable of catalyzing the resin decomposition.

The compounds of this invention are prepared by the reaction of peracetic acid and an alkyl substituted 3-cyclohexenylmethyl linoleate which may be illustrated by the following general equation:

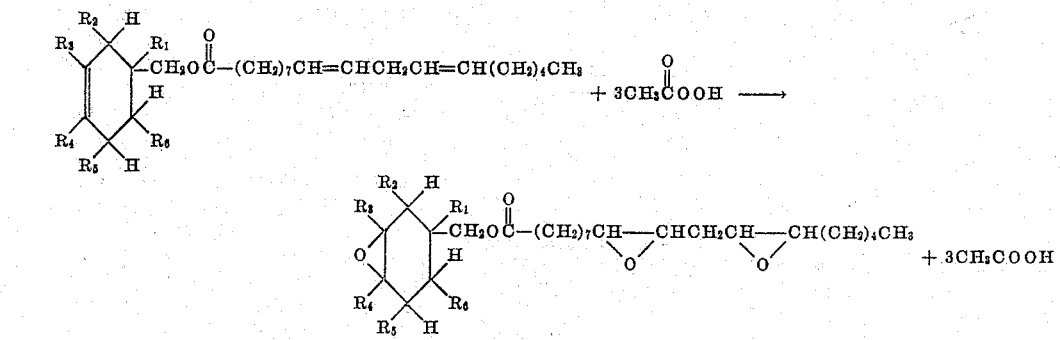

wherein the radicals $R_1$ through $R_6$ represent hydrogen or alkyl groups.

The process of this invention is carried out at temperatures in the range of —25° C. to 150° C. At lower temperatures the rate of epoxidation is slow and long reaction times are required. At higher temperatures the rate of epoxidation is fast but precautions are required to prevent the further reaction of the epoxide groups. Temperatures in the range of from 10° C. to 90° C. are preferably used to provide a suitable reaction rate and to avoid undesired side reactions. The starting material is usually charged to a reaction vessel, and the theoretical quantity of peracetic acid is then added to the reaction vessel. Three or more moles of peracetic acid are usually added to the triene starting material. Both types of double bonds in the molecule are relatively easily attacked by the peracetic acid, and the epoxidation of both types appears to proceed simultaneously. The reaction is allowed to proceed until approximately the theoretical amount of peracetic acid is consumed, which is usually about eight hours or less, as determined by a titration for peroxide. In working up the crude reaction product, it is desirable to separate the byproduct acetic acid from the epoxide since acetic acid will react with the epoxide group attached to the cyclohexane ring thus reducing the overall yield. The reaction mixture is then subjected to conventional recovery procedures for the recovery of the triepoxide product. The product can be recovered by extraction with a suitable solvent, continuous distillation, or distillation under reduced pressures as desired, or a residue product may be taken.

Other more expensive peroxides such as perbenzoic acid, monoperphthalic acid, performic acid and hydroperoxides may be used as the epoxidizing agent. However, they are less desirable than peracetic acid for commercial application.

The starting materials are prepared by esterification of linoleic acid with 3-cyclohexenylmethanol and its alkyl derivatives. The alcohols are generally obtained by the reduction of the corresponding cycloaliphatic aldehydes which are prepared by the Diels-Alder reaction of butadiene or a substituted butadiene with acrolein, crotonaldehyde, methacrolein and the like. A variety of cycloaliphatic aldehydes suitable for reduction to the corresponding alcohol can be produced having alkyl substituents on the ring when compounds such as acrolein, crotonaldehyde, and methacrolein are reacted with dienes such as butadiene, isoprene, 1,3-pentadiene, 2,3-dimethyl-1,3-pentadiene and the like.

Linoleic acid is available in mixtures of many commercially available long chain fatty acid obtained by saponification of animal and vegetable fats and oils. Pure linoleic acid may be obtained from these mixtures by well-known methods which are described in the literature.

The following example will serve to illustrate the practice of the invention.

EXAMPLE 1

*Preparation of 3,4-epoxycyclohexylmethyl 9,10,12,31-diepoxystearate*

Linoleic acid was prepared from commercial safflower oil by a process similar to that described in Organic Syntheses, vol. 22, page 79. One hundred seventy-five grams powdered potassium hydroxide was dissolved in 750 milliliters of methanol in a reaction flask and then 550 milliliters of safflower oil was added. The kettle contents were stirred and refluxed for three hours and then the methanol was removed by distillation. To the residue was added 500 milliliters of water and then 750 milliliters of cold 20 percent sulfuric acid. The fatty acid layer was separated and washed with hot water, filtered while hot, and then dried by heating to 140° C. with stirring. The yield of crude acids at this point was 464 grams.

Three hundred sixty grams of urea was dissolved in hot methanol to make 900 milliliters of solution. To this hot solution was added the crude acid (464 grams), and heating was continued until solution was complete. The solution was cooled to —11° C. overnight and then filtered. Methanol was evaporated from the filtrate. The residue was washed once with water and once with dilute hydrochloric acid solution. The organic acid layer was distilled through a six-inch packed column to give 192 grams of product, boiling point 158–160° C. at 0.25 mm. of Hg absolute, $n_D^{30}$ 1.4658, which analyzed 99 percent linoleic acid by titration and gave an iodine number of 175 (theoretical, 181).

To a still kettle was charged 188 grams (0.67 mole) of linoleic acid, 79 grams (0.705 mole) of 3-cyclohexenylmethanol, 450 grams of toluene and 0.5 gram of concentrated sulfuric acid. The solution was refluxed for five hours and 12 grams of water separated as a lower layer in the still head. The kettle contents were cooled, and the catalyst was neutralized with 4 grams of sodium acetate. After filtration, distillation afforded 216 grams (86 percent yield) of 3-cyclohexenylmethyl linoleate, having a boiling point of 171–192° C. at 0.3–0.5 mm. of Hg absolute, $n_D^{30}$ 1.4754–1.4772, which gave an iodine number of 185 (theoretical, 204).

Two hundred four grams (0.545 mole) of 3-cyclohexenyl-methyl linoleate was charged to a reaction flask and heated to 35° C. Then with stirring, 746 grams of 22.0 percent solution of peracetic acid in acetone (164 grams, 2.16 moles of peracetic acid) was added over a period of one hour and ten minutes. The temperature was maintained at 35–40° C. during the addition and for a period of six more hours. The reaction solution was stored overnight at —11° C. Analysis for peroxide at this time indicated that 99.3 percent of the theoretical amount of peracetic acid had been consumed.

The reaction solution was then added dropwise to a still kettle containing 1000 milliliters of ethylbenzene refluxing at 25 mm. Hg pressure absolute. During the addition, acetone, peracetic acid, acetic acid, and ethylbenzene were distilled and after the addition, the contents of the kettle were stripped of low-boiling material. There was obtained 236 grams of residue product which analyzed 9.49 percent oxirane oxygen by the hydrogen bromide method and had an iodine number of 2.3.

In a similar manner other cyclohexenylmethyl linoleates containing alkyl substituents, and particularly methyl substituents, in the cyclohexenyl ring can be epoxidized. Thus for example 3,4-epoxy-1-methylcyclohexylmethyl-9,10,12,13-diepoxystearate and 3,4-epoxy-6-methylcyclohexylmethyl-9,10,12,13-diepoxystearate can be readily prepared.

In the foregoing example the analysis for oxirane oxygen is based on its quantitative reaction with a measured excess of hydrogen bromide to form the bromohydrin. A hydrogen bromide solution was prepared by adding 67 milliliters of bromine to 2 liters of glacial acetic acid. Reagent grade phenol was then added until the solution became straw in color and then a further 10 gram quantity was added to the solution. A sample of the epoxide compound was introduced into a flask containing 25 milliliters of the hydrogen bromide solution. The flask was then closed and allowed to stand at room temperature for 30 minutes. At the end of that time the flask was opened and the stopper and walls of the flask washed down with 25 milliliters of glacial acetic acid and 5 to 6 drops of crystal violet indicator were added and the solution titrated with standard 0.2 N sodium acetate to the first bluish-green end-point. A blank was run in precisely the same fashion except that the sample was omitted.

What is claimed is:

1. A triepoxide, represented by the formula:

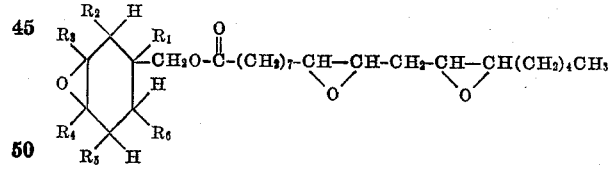

wherein R₁ through R₆ represent members selected from the group consisting of hydrogen and lower alkyl groups wherein the total number of carbon atoms in said lower alkyl groups is not greater than ten.

2. 3,4 - epoxycyclohexylmethyl 9,10,12,13 - diepoxystearate.

3. 3,4 - epoxy - 6 - methylcyclohexylmethyl 9,10,12,13-diepoxystearate.

4. 3,4 - epoxy - 1 - methylcyclohexylmethyl 9,10,12,13-diepoxystearate.

References Cited in the file of this patent

UNITED STATES PATENTS

| | | |
|---|---|---|
| 2,485,160 | Niederhauser | Oct. 18, 1949 |
| 2,541,670 | Segall | Feb. 13, 1951 |